(12) United States Patent
Sato et al.

(10) Patent No.: US 7,850,938 B2
(45) Date of Patent: Dec. 14, 2010

(54) SILICON PARTICLES, SILICON PARTICLE SUPERLATTICE AND METHOD FOR PRODUCING THE SAME

(75) Inventors: Seiichi Sato, Hyogo (JP); Keisaku Kimura, Hyogo (JP); Takashi Kawasaki, Machida (JP); Takuya Okada, Machida (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 761 days.

(21) Appl. No.: 10/592,864

(22) PCT Filed: Feb. 18, 2005

(86) PCT No.: PCT/JP2005/002574

§ 371 (c)(1),
(2), (4) Date: Sep. 13, 2007

(87) PCT Pub. No.: WO2005/090234

PCT Pub. Date: Sep. 29, 2005

(65) Prior Publication Data

US 2008/0131694 A1 Jun. 5, 2008

(30) Foreign Application Priority Data

Mar. 17, 2004 (JP) .............................. 2004-075521
Mar. 17, 2004 (JP) .............................. 2004-076141

(51) Int. Cl.
*C01B 33/029* (2006.01)

(52) U.S. Cl. ...................... 423/324; 423/337; 423/348; 423/349

(58) Field of Classification Search ................ 423/324, 423/337, 348, 349

See application file for complete search history.

(56) References Cited

U.S. PATENT DOCUMENTS

| 5,298,296 | A  | * | 3/1994 | Kojima et al. | 427/600 |
| 7,001,579 | B2 | * | 2/2006 | Metzger et al. | 423/349 |
| 7,553,466 | B2 | * | 6/2009 | Herold et al. | 423/349 |
| 7,632,478 | B2 | * | 12/2009 | Poepken et al. | 423/349 |

FOREIGN PATENT DOCUMENTS

| JP | 05-062911 A | 3/1993 |
| JP | 6-72705 A | 3/1994 |
| JP | 6-279015 A | 10/1994 |

(Continued)

OTHER PUBLICATIONS

JP 06-279,015, 1994.*

(Continued)

*Primary Examiner*—H. (Holly) T Le
(74) *Attorney, Agent, or Firm*—Birch, Stewart, Kolasch & Birch, LLP

(57) ABSTRACT

A production method, comprising a step of synthesizing silicon particle-containing silicon oxide particles by performing a gas phase reaction of monosilane gas and oxidizing gas for oxidizing the monosilane gas and a step of removing the silicon oxide with hydrofluoric acid after holding the silicon oxide particle powder in an inert atmosphere at 800-1400°, provides high-purity silicon nanoparticles which are highly practical as material powder for high-performance light-emitting elements and electronic parts in an industrial scale.

1 Claim, 2 Drawing Sheets

FOREIGN PATENT DOCUMENTS

| | | |
|---|---|---|
| JP | 06-349744 A | 12/1994 |
| JP | 11-130867 A | 5/1999 |
| JP | 2002-154817 A | 5/2002 |
| JP | 2002-279704 A | 9/2002 |
| JP | 2003-089896 A | 3/2003 |
| JP | 2003-515459 A | 5/2003 |
| WO | WO-03/026017 A1 | 3/2003 |

OTHER PUBLICATIONS

JP 2002-154,817, 2002.*

* cited by examiner

[Fig. 1]
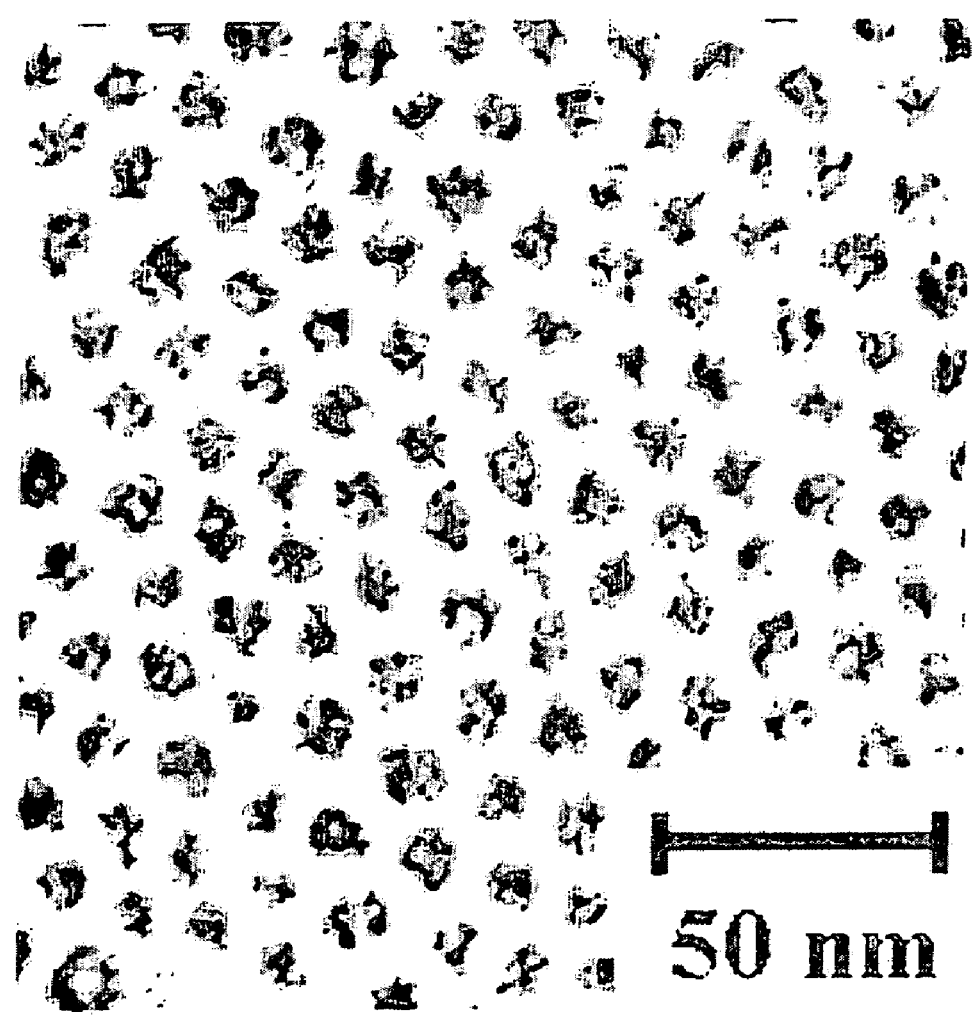

[Fig. 2]

SILICON PARTICLES, SILICON PARTICLE SUPERLATTICE AND METHOD FOR PRODUCING THE SAME

TECHNICAL FIELD

The present invention relates to nanometer (nm)-sized high-purity silicon particles and a method for producing the same.

The present invention also relates to a silicon particle superlattice which has nanometer (nm)-sized silicon particles two-dimensionally or three-dimensionally arranged periodically with regularity and a method for producing the same.

BACKGROUND ART

Silicon particles (silicon nanoparticles) having a particle diameter of the order of nanometers have physical and chemical properties considerably different from those of bulk silicon, and are attracting a lot of attention as new functional material in recent years. For example, the silicon nanoparticles have a band structure different from that of the bulk silicon based on the quantum confinement effects and surface level effect, and a luminous phenomenon which is not observed on the bulk silicon is observed, so that it is expected to be applied as material for a novel silicon light emitting device.

Ordinary fine silicon powder obtained by finely pulverizing silicon has physical and chemical properties substantially corresponding with those of the bulk silicon. Meanwhile, the silicon nanoparticles have a very fine particle diameter, a relatively small particle size distribution width, and high purity. Therefore, it is considered that a peculiar property such as a luminous phenomenon quite different from the bulk silicon is expressed.

Conventionally, as the method for production of silicon nanoparticles, there have been used, for example, (1) a method of passing silicon vaporized by a first high-temperature plasma generated between mutually opposed silicon electrodes through a second high-temperature plasma generated by electrodeless discharge in a reduced-pressure atmosphere (Patent Literature 1), (2) a method of separating and removing silicon nanoparticles from a positive electrode, which is formed of a silicon wafer, by electrochemical etching (Patent Literature 2), and (3) a method for electrode reduction of a halogen-containing organic silicon compounds using reactive electrodes (Patent Literature 3).

But, the above-described methods (1), (2) are hard to improve productivity because they have a considerably low silicon nanoparticle generation speed. The above-described method (3) has a halogen element such as Cl in raw material, and it is easily mixed into a product, so that a total amount of Na, Fe, Al, Cl is hard to become 10 ppm or less.

Therefore, it is quite difficult to produce high-purity silicon nanoparticles which are useful as material powder for high-performance light-emitting elements and electronic parts in an industrial scale.

Meanwhile, for expression of a luminous phenomenon or the like based on the above-described band structure and surface level effect, a so-called superlattice structure that has silicon particles having a uniform particle diameter of the order of nanometers two-dimensionally or three-dimensionally arranged periodically with regularity must be formed.

Therefore, as a specific method of using the silicon particles of the order of nanometers as new functional material, there is required a method that selectively removes particles having a particular size from silicon particles produced in a large amount and arranges them two-dimensionally or three-dimensionally, or forms a superlattice.

Conventionally, as a method for production of silicon particles or a superlattice containing the silicon particles, or a film or a formed product having the silicon particles arranged, there are proposed (a) chemical vapor deposition (CVD) method (Patent Literatures 4, 5), (b) spin coat method (Patent Literature 6), (c) method of straining a suspension containing particles through a porous barrier wall to obtain particles (Patent Literature 7), (d) method of using particle electrophoresis (Patent Literature 8), and the like.

But, the above method (a) is often performed in vacuum at a high temperature or in a plasma atmosphere, so that a highly controlled vacuum heating device or a plasma generating device is necessary and the cost becomes high. And, the method (b) does not need an expensive device such as that used for the method (a) but product yield lowers considerably. The methods (c), (d) arrange particles on the porous barrier wall or electrode, but there is no appropriate method for removal of a film or formed product which is formed of a superlattice from such materials.

The superlattice containing the conventional silicon particles obtained by the above methods has variations in particle diameter, so that the band structure or the surface level becomes unstable. When it is used as a light-emitting element, luminous efficiency does not become high enough, and when it is used as electronic parts, there is a possibility of malfunction.

[Patent Literature 1] Japanese Patent Laid-Open Publication No. Hei 6-279015

[Patent Literature 2] Japanese Patent Publication No. 2003-515459

[Patent Literature 3] Japanese Patent Laid-Open Publication No. 2002-154817

[Patent Literature 4] Japanese Patent Laid-Open Publication No. Hei 5-62911

[Patent Literature 5] Japanese Patent Laid-Open Publication No. Hei 6-349744

[Patent Literature 6] Japanese Patent Laid-Open Publication No. Hei 11-1308867

[Patent Literature 7] Japanese Patent Laid-Open Publication No. 2002-279704

[Patent Literature 8] Japanese Patent Laid-Open Publication No. 2003-89896

SUMMARY OF THE INVENTION

Accordingly, the present inventors have made a devoted study to find a production method capable of producing high-purity silicon nanoparticles that can realize high-performance light-emitting elements and electronic parts in an industrial scale. As a result, it was found that high-purity nanometer-sized silicon particles having relatively uniform particle diameters can be produced in an industrial scale by a method of removing excess silicon oxide with hydrofluoric acid after heating under particular conditions silicon particle-containing silicon oxide produced by a gas phase method using particular materials. Thus, the present invention was completed.

In other words, the silicon particles of the present invention has a particle diameter of 1-50 nm, and a total amount of Na, Fe, Al, Cl is 10 ppm or less.

And, the silicon powder of the present invention contains 90 mass % or more of silicon particles having a particle diameter of 1-50 nm and a total amount of Na, Fe, Al, Cl is 10 ppm or less.

Besides, a method for production of silicon particles of the present invention comprises synthesizing silicon oxide particles which contain silicon particles by performing a gas phase reaction of monosilane gas and oxidizing gas for oxidizing the monosilane gas, and removing the silicon oxide by hydrofluoric acid after keeping the silicon oxide particles in an inert atmosphere at 800-1400° C.

And, the present inventors have made a devoted study to find a method of efficiently producing a superlattice of silicon particles capable of realizing high-performance light-emitting elements and electronic parts at a low cost and completed the present invention.

Specifically, the silicon particle superlattice of the present invention is a silicon particle superlattice formed of plural silicon particles, wherein the silicon particles have an average particle diameter of 1-50 nm, and a variation coefficient of a particle diameter is 20% or less.

The method for production of the silicon particle superlattice of the present invention has a step that adds a hydrophobic solvent to the suspension which has hydrophobic silicon particles dispersed into water, leaves it at rest, and arranges the silicon particles at the interface between an aqueous phase and an organic phase. And, the method includes "the suspension contains hydrofluoric acid" and "the hydrophobic solvent is 1-octanol" as desirable modes.

The silicon particle superlattice structure of the present invention has the above silicon particle superlattice on the hydrophobic surface of the solid substrate having the hydrophobic surface and includes "the solid substrate must be a silicon substrate or a graphite substrate" as a preferable mode.

Besides, the light-emitting elements and electronic parts of the present invention have at least either the above silicon particle superlattice or the above silicon particle superlattice structure.

EFFECTS OF THE INVENTION

The silicon particles of the present invention are nanoparticles having a relatively uniform particle diameter of 1-50 nm and a total amount of Na, Fe, Al, Cl of 10 ppm or less and highly pure.

Generally, silicon particles have a band structure different from bulk silicon according to the quantum confinement effects and surface level effect, a particle diameter is determined to be 1-5 nm when a luminous phenomenon which is not observed on bulk silicon is shown, and a quantum well structure that is important when applied to electronic parts is recognized for an aggregate of particles having a uniform particle diameter of 10 nm or less. The silicon particles of the present invention have a particle diameter of 1-50 nm, including a range of particle diameters that a quantum confinement effect, a surface level effect or a quantum well structure is expressed.

And, if silicon contains an impurity such as Na, Fe, Al or Cl, an impurity level is formed in the band structure, lowering luminous efficiency of the light-emitting element or causing a malfunction of the electronic parts. The total amount of Na, Fe, Al, Cl of the silicon particles of the present invention is 10 ppm or less, so that the impurity level is not formed, and the above defect does not occur in the light-emitting element or the electronic parts.

Therefore, the silicon particles of the present invention are different from the conventional silicon nanoparticles and highly practicable as material powder for high-performance light-emitting elements and electronic parts.

The method for production of the silicon particles according to the present invention uses a particular silicon-containing gas (monosilane gas) as raw material, reacts it with oxidizing gas under particular conditions to synthesize silicon particle-containing silicon oxide, heats it under particular conditions, and removes excess silicon oxide with hydrofluoric acid. Thus, it is different from a conventional method for production of silicon nanoparticles, has high productivity and can produce in an industrial scale. Therefore, the silicon nanoparticles can be applied to light-emitting elements and electronic parts in an industrial scale and are very useful industrially.

The silicon particles configuring the superlattice of the present invention have a relatively uniform average particle diameter of 1-50 nm, and the variation coefficient of the particle diameter is 20% or less. The superlattice is a lattice-like aggregate of particles that has particles of assembled atoms and molecules further assembled mutually and two-dimensionally or three-dimensionally arranged periodically with regularity. The superlattice of the present invention having small variations in particle diameter can arrange particles having small variations in surface level at a remarkable periodicity, so that material having a desired band structure can be produced stably.

Thus, the silicon particle superlattice can produce various types of band structures in accordance with the intended use, when used as a light-emitting element, a sufficient luminous efficiency can be obtained, and when used as an electronic part, material which seldom causes malfunction can be produced. Therefore, the performance improvement of the electronic instruments becomes easy, and the present invention highly contributes to functional material production technology in an industrial scale and is very useful industrially.

BRIEF DESCRIPTION OF THE DRAWINGS

FIG. 1 TEM photograph showing an example of a silicon particle superlattice according to the present invention.

FIG. 2 Fourier transform image showing an example of a silicon particle superlattice according to the present invention.

BEST MODE FOR CARRYING OUT THE INVENTION

Silicon Particles

Silicon particles of the present invention have a particle diameter of 1-50 nm, and preferably 1-30 nm. If the particle diameter is not in the above ranges, the quantum confinement effects, surface level effect or quantum well structure suitable for application to light-emitting elements and electronic parts cannot be expressed. And, a total amount of Na, Fe, Al, Cl of the silicon particles of the present invention is 10 ppm or less, and preferably 5 ppm or less. If the total amount of Na, Fe, Al, Cl exceeds 10 ppm, the properties of light-emitting elements and electronic parts are affected by impurities.

<Silicon Powder>

Silicon powder of the present invention contains 90 mass % or more of silicon particles of the present invention. If a content of silicon particles of the present invention is 90 mass % or more, unnecessary particles can be removed directly or by a simple post-treatment, but if it is less than 90 mass %, the easy removal of unnecessary particles is lost.

<Method for Production of Silicon Particles>

Silicon particles of the present invention can be produced by, for example, heating silicon particle-containing silicon oxide particles synthesized from a gas phase using monosilane gas and an oxidizing gas in a prescribed atmosphere at a prescribed temperature, and removing silicon oxide.

Specifically, monosilane gas is first reacted with oxidizing gas in a gas phase to synthesize silicon particle-containing silicon oxide particles. The reaction is performed by introducing monosilane gas and oxidizing gas into a reaction vessel.

Here, material for a silicon source of the present invention is monosilane gas. In addition to the monosilane gas, when silicon-containing gas, e.g., chlorosilanes ($SiH_nCl_{4-n}$, n=integer of 0 to 3) is used as material, a total amount of Na, Fe, Al, Cl exceeds 10 ppm.

The oxidizing gas is not particularly limited if it could oxidize the monosilane gas, and oxygen gas, air, steam, nitrogen dioxide, carbon dioxide and the like can be used, and oxygen gas is particularly desirable in view of ease of handling, ease of reaction control and the like. In order to facilitate the reaction control, a third gas such as hydrogen, nitrogen, ammonia, carbon monoxide or the like can also be introduced into the reaction vessel as long as it does not disturb the reaction in addition to the inert gas such as argon, helium, to dilute the monosilane gas and the oxidizing gas.

The reaction is preferably performed with the reaction vessel kept at a temperature of 500° C. to 1000° C. and a pressure of 10-1000 kPa. The reaction vessel generally used is made of a high-purity material such as quartz glass, and its shape is not particularly limited but desired to have a tube shape. The axial direction of the tube may be either vertical or horizontal. For the method of heating the reaction vessel, any method such as resistance heating, high-frequency induction heating, infrared radiation heating or the like can be used.

The silicon particle-containing silicon oxide particles produced in the reaction vessel are exhausted together with a gas flow from the system and recovered from a powder collecting apparatus such as a bag filter.

The recovered silicon oxide particles are then held in an inert atmosphere at 800 to 1400° C. Thus, the silicon particles contained in the silicon oxide particles are adjusted to a particle diameter of 1 to 50 nm. If the holding temperature is less than 800° C., the silicon particles have a particle diameter of less than one nm, the impurities are likely to remain in the silicon, and the total amount of Na, Fe, Al, Cl exceeds 10 ppm. If the temperature exceeds 1400° C., the silicon particles have a particle diameter of exceeding 50 nm.

The inert atmosphere gas used can be hydrogen, nitrogen, ammonia, and carbon monoxide other than the inert gas such as argon and helium, but argon gas is particularly desirable in view of ease of handling and the like.

After the particle diameter of the contained silicon particles is adjusted, the silicon oxide particles are added to and dispersed into water. The particles are dispersed by ultrasonic waves or a stirrer, but it is particularly desirable to use ultrasonic waves. After the silicon oxide particles are dispersed into water to suspend, hydrofluoric acid is added to the suspension. The silicon particles contained in the silicon oxide particles are not dissolved by hydrofluoric acid, but the surrounding silicon oxide is dissolved and removed, so that only the silicon remains and the silicon particles of the present invention can be obtained.

<Silicon Particle Superlattice>

Silicon particles configuring the silicon particle superlattice of the present invention have an average particle diameter of 1-50 nm, and preferably 5-20 nm. If the average particle diameter is less than one nm, it is hard to arrange the particles with regularity. And, if the average particle diameter exceeds 50 nm, the physical and chemical properties become hardly different from those of the bulk silicon, and meaning of forming the superlattice is lost.

The particle diameter of the silicon particles have variation coefficient of 20% or less. If the variation coefficient of the particle diameter exceeds 20%, variations in particle diameter are so large that a band cannot be formed. According to the present invention, "the variation coefficient of the particle diameter" is a value obtained by dividing a standard deviation of the particle diameter by an average value, which is an index indicating variations in particle diameter, indicating that the smaller the value, the smaller the variations in particle diameter.

As a specific method of measuring the average particle diameter and the variation coefficient, there is, for example, a method of performing image analysis of a transmission electron microscope (TEM) image of a superlattice. To analyze the superlattice formed of a large number of silicon particles, it is desirable to perform on 100 or more particles.

It is possible to judge with reference to the TEM image whether or not a lot of particles are mutually arranged with regularity in the silicon particle superlattice of the present invention, but for more detail, judgment can be made on a Fourier transform image of the TEM image. Where particles are mutually arranged with regularity, a subject spot corresponding to the formation of the lattice appears on the Fourier transform image. For example, FIG. 1 is the TEM image as one example of the silicon particle superlattice of the present invention, and FIG. 2 is its Fourier transform image. In FIG. 2, spots having 6 times of being an object are observed on the Fourier transform image, and it is seen that a superlattice with the particles mutually arranged with regularity is formed.

<Silicon Particle Superlattice Production Method, Silicon Particle Superlattice Structure, Light-Emitting Element, Electronic Parts>

Then, a method for production of a silicon particle superlattice of the present invention will be described.

First, a method for production of a lot of silicon particles is not particularly limited if the obtained silicon particles have hydrophobicity. For example, there can be applied a method of subjecting monosilane gas and oxidizing gas for oxidizing the monosilane gas to a gas phase reaction to synthesize silicon particle-containing silicon oxide particles and holding the particles in an inert atmosphere at 800-1400° C. This method is preferable because silicon particles which are contained in the silicon oxide are adjusted to a particle diameter of about 1-50 nm by keeping under heat in the inert atmosphere. As described later, variations in particle diameter are decreased in a step of arranging the silicon particles on the interface between the aqueous phase and the hydrophobic solvent, so that it does not matter even if variations at this time is relatively large.

Silicon oxide of the silicon particle-containing silicon oxide particles can be removed by hydrofluoric acid. This method is particularly convenient because it is a step of exposing the silicon particles contained in the silicon oxide and also serves as a step of giving hydrophobicity to the surfaces of the silicon particles. The reason why the hydrophobicity is given to the surfaces of the silicon particles by the hydrofluoric acid is considered that the silicon oxide which is around the silicon particles is removed by the hydrofluoric acid, and hydrogen fluoride (HF) acts on the uppermost surface of the exposed silicon particles at the same time to bond silicon atoms and hydrogen, and the particle surface is modified with hydrogen atoms.

At this time, where the silicon oxide particles are previously dispersed into water to prepare a suspension and the hydrofluoric acid is dripped to the suspension, the silicon particles having hydrophobicity can be obtained in a state of the suspension. Therefore, the method for production of the silicon particle superlattice of the present invention can be applied as it is. Thus, it is preferable. And, to improve dispersibility of the silicon particles, it is desirable to apply vibration of ultrasonic waves to the suspension.

Then, a hydrophobic solvent is added to the suspension. Thus, the hydrophobic silicon particles are moved from the aqueous phase into the organic phase (hydrophobic solvent). At this time, to accelerate the movement of the particles, it is desirable to continue the application of vibration of ultrasonic waves after the addition of the hydrophobic solvent. If the silicon particles do not have hydrophobicity, the movement into the hydrophobic solvent does not take place.

Then, it is left at rest to separate the aqueous phase and the organic phase, and the silicon particles dispersed into the hydrophobic solvent are gradually aggregated and arranged on the interface between the aqueous phase and the organic phase. At the time of the aggregation and arrangement, a superlattice of the silicon particles is formed on the interface between the aqueous phase and the organic phase because the particles having similar particle diameters are selectively aggregated and arranged though the reason is not known. First, in a case where powder of silicon particles having relatively large variations in particle diameter is used, a lot of superlattices having different average particle diameters are formed at different portions of the interface. If the solvent is not hydrophobic, the interface is not formed between the aqueous phase and the organic phase, so that the superlattice is not formed.

Specific examples of the hydrophobic solvent include an aliphatic hydrocarbon-based solvent such as water-insoluble or poorly water-insoluble n-hexane or n-heptane, an alicyclic hydrocarbon-based solvent such as cyclohexane or methyl-cyclohexane, an aromatic hydrocarbon-based solvent such as toluene or xylene, higher fatty alcohols such as 1-butanol, 1-octanol, and the like. Among them, 1-octanol having an appropriate viscosity is particularly desirable to perform smooth aggregation and arrangement of the silicon particles on the interface between the aqueous phase and the organic phase.

The time period for application of ultrasonic vibration after the addition of the hydrophobic solvent and the time period of leaving at rest are not limited especially, but where the hydrophobic solvent is 1-octanol, it is desirable that the ultrasonic vibration after the addition is performed for about 30 minutes to one hour, and then the time period of leaving at rest is two days or more.

Thus, the superlattice formed of the silicon particles which are formed on the interface between the aqueous phase and the organic phase is moved onto a solid substrate having a hydrophobic surface after being separated by means of a semipermeable membrane, for example, a collodion membrane. Thus, a superlattice structure directly formed on the substrate can be obtained. Examples of the solid substrate having the hydrophobic surface include a silicon substrate (silicon wafer), a graphite substrate and the like.

It is also possible to directly form the superlattice on the substrate having the hydrophobic surface by adding the hydrophobic solvent to separate the aqueous phase and the organic phase, inserting the solid substrate having the hydrophobic surface immediately to the position of the interface between them so that the hydrophobic surface is directed to the hydrophobic solvent, and then leaving to stand at rest. At this time, when a hydrophobic region and a hydrophilic region are previously patterned on the substrate surface by a lithography technology or the like, the superlattice can be formed at a desired position of the substrate. Especially, where the superlattice structure of the present invention is directly formed on the silicon substrate, it becomes possible to use as an element for functional materials such as novel light-emitting elements, electronic parts and the like.

EXAMPLES

The present invention will be further described with reference to Examples and Comparative Examples.

Example 1

Monosilane gas of 0.16 L/min, oxygen gas of 0.4 L/min and diluting nitrogen gas of 17.5 L/min were introduced into a reaction vessel formed of a quartz glass reaction tube (inside diameter of 50 mm, length of 1000 mm) held at a temperature of 700° C. and a pressure of 90 kPa to produce dark brown powder. It was collected by a metallic filler which was disposed downstream of the reaction tube.

The collected powder had a specific surface area of 55 m$^2$/g when measured according to a BET one-point method. The powder was found by chemical analysis to have primary components of silicon (Si) and oxygen (O). And, a bonded state of Si was determined by Si$_{2p}$ spectrum of XPS (X-ray photoelectron spectroscopy). There were recognized a peak attributed to Si—Si bonding other than a peak attributed to Si—O bonding, and it was found that silicon particles were contained in the produced silicon oxide particles.

The powder in 20 g was held at a temperature of 1100° C. for one hour in an argon atmosphere and then cooled to room temperature. One liter of distilled water was added thereto, ultrasonic waves were applied for one hour to disperse the powder, thereby producing a suspension. 0.1 liter of 5% concentration-hydrofluoric acid (HF) was added to the suspension, and ultrasonic waves were applied for 30 minutes to dissolve and remove silicon oxide. Then, a membrane filter was used to filtrate and wash the suspension to separate a product, which was then dried to obtain silicon powder.

It was checked by chemical analysis that the primary component of the powder was Si, and a total amount of Na, Fe, Al, Cl was 5 ppm. Besides, particles contained in the powder were measured by a transmission electron microscope (TEM) to have a particle diameter of 10-40 nm.

Example 2

Monosilane gas at 0.08 L/min, oxygen gas at 0.044 L/min and diluting argon gas at 18 L/min were introduced into the same reaction vessel formed of the quartz glass reaction tube as that in Example 1 held at a temperature of 750° C. and a pressure of 50 kPa to produce dark brown powder. It was collected by the same manner as in Example 1.

The collected powder had a specific surface area of 150 m$^2$/g when it was measured. The powder was found by chemical analysis to have primary components of Si and oxygen. Si$_{2p}$ spectrum of XPS was checked to find a peek attributed to Si—Si bonding, and it was checked that the product was silicon particle-containing silicon oxide particles.

The procedure of Example 1 was performed to obtain silicon powder except that the powder in 20 g was held at a temperature of 900° C. for one hour in a helium atmosphere. It was checked by chemical analysis that the primary component of the powder was Si, and a total amount of Na, Fe, Al, Cl was 8 ppm. Besides, particles contained in the powder were measured by the TEM to have a particle diameter of 2-24 nm.

Comparative Example 1

The procedure of Example 1 was performed to obtain silicon powder except that 20 g of powder formed of Si-containing silicon oxide particles was held at a temperature of 1450° C. for one hour in an argon atmosphere.

It was checked by chemical analysis that the primary component of the powder was Si, and a total amount of Na, Fe, Al, Cl was 4 ppm. Besides, the particles were measured by the TEM for a particle diameter to find that they were powder formed of particles having a particle diameter of 35 nm or more containing 12 mass % of particles having a particle diameter of exceeding 50 nm.

Comparative Example 2

The procedure of Example 1 was performed to obtain silicon powder except that 20 g of powder formed of Si-containing silicon oxide particles was held at a temperature of 700° C. for one hour in an argon atmosphere.

It was checked by chemical analysis that the primary component of the powder was Si, and a total amount of Na, Fe, Al, Cl was 18 ppm. Besides, the particles were measured by the TEM for a particle diameter to find that they were powder formed of particles having a particle diameter of 10 nm or less containing 16 mass % of particles having a particle diameter of less than 1 nm.

Comparative Example 3

The procedure of Example 2 was performed to obtain silicon powder except that 20 g of powder formed of Si-containing silicon oxide particles was held at a temperature of 700° C. for one hour in a helium atmosphere.

It was checked by chemical analysis that the primary component of the powder was Si, and a total amount of Na, Fe, Al, Cl was 23 ppm. Besides, the particles were measured by the TEM for a particle diameter to find that they were powder formed of particles having a particle diameter of 6 nm or less containing 40 mass % of particles having a particle diameter of less than 1 nm.

Comparative Example 4

The procedure of Example 1 was performed to introduce gas into the reaction vessel to produce dark brown powder except that silicon tetrachloride ($SiCl_4$) gas, which was often used as raw material for polycrystalline silicon, was used instead of monosilane gas, and the powder was collected by the same manner as in Example 1.

The collected powder had a specific surface area of 45 $m^2/g$ when it was measured. The powder was found by chemical analysis to have primary components of Si and oxygen. $Si_{2p}$ spectrum of XPS was checked to find a peek attributed to Si—Si bonding, and it was checked that the product was silicon particle-containing silicon oxide powder particles.

The powder in 20 g was used to obtain silicon powder by performing the procedure of Example 1. The primary component of the powder was Si, and the particles measured by the TEM had a particle diameter of 5-35 nm. Particularly, chlorine (Cl) was contained in a large amount, and a total amount of Na, Fe, Al, Cl was 50 ppm.

Example 3

Monosilane gas of 0.16 L/min, oxygen gas of 0.4 L/min and diluting nitrogen gas of 17.5 L/min were introduced into a reaction vessel formed of a quartz glass reaction tube (inside diameter of 50 mm, length of 1000 mm) held at a temperature of 780° C. and a pressure of 90 kPa to produce dark brown powder. It was collected by a metallic filler which was disposed downstream of the reaction tube.

The collected powder had a specific surface area of 62 $m^2/g$ when measured according to the BET one-point method. The powder was found by chemical analysis to have primary components of silicon (Si) and oxygen (O). And, a bonded state of Si was determined by $Si_{2p}$ spectrum of XPS (X-ray photoelectron spectroscopy). There were recognized a peak attributed to Si—Si bonding other than a peak attributed to Si—O bonding, and it was found that silicon particles were contained in the produced silicon oxide powder particles.

The powder in 2 g was held at a temperature of 1200° C. for 30 minutes in an argon atmosphere and then cooled to room temperature. 0.1 liter of distilled water was added thereto, and ultrasonic waves were applied for one hour to disperse the powder, thereby producing a suspension. 0.01 liter of 5% concentration-hydrofluoric acid (HF) was added to the suspension, and ultrasonic waves were applied for 30 minutes to dissolve and remove silicon oxide. Then, 0.2 litter of 1-octanol was added as a hydrophobic solvent, ultrasonic waves were applied for 30 minutes, and then the resultant product was left standing for two days.

Then, a support having a collodion membrane adhered to a mesh (#1000) for preparing samples for the transmission electron microscope (TEM) was used to take a portion around the interface between 1-octanol and an aqueous solution, and the obtained sample was dried at 60° C. for three days.

The sample observed by the TEM had a structure that the particles shown in FIG. 1 were arranged with regularity. Besides, a Fourier transform image was pictured in the same field of view to find spots having 6 times of being an object shown in FIG. 2, and the formation of a superlattice was checked. And, for the TEM image of FIG. 1, an image of 115 silicon particles was sampled to perform image analysis using computer software (a product of Lasertec Corporation, SALT Ver. 3.62). It was found that an average particle diameter was 9 nm, and the particle diameter had a variation coefficient of 17%.

Example 4

The procedure of Example 3 was performed to collect dark brown powder except that a temperature was changed to 700° C. The powder had a specific surface area of 42 $m^2/g$. The powder was found by chemical analysis to have primary components of silicon (Si) and oxygen (O). There were recognized a peak attributed to Si—Si bonding other than a peak attributed to Si—O bonding by XPS, and it was found that silicon particles were contained in the produced silicon oxide powder particles.

The procedure of Example 3 was performed except that the powder in 2 g was held at a temperature of 1100° C. for 60 minutes in an argon atmosphere to dissolve and remove silicon oxide. Then, 0.2 liter of xylene was added as a hydrophobic solvent, ultrasonic waves were applied for 30 minutes, and then the resultant product was left standing for one day.

Then, the procedure of Example 3 was performed to prepare a TEM sample except that one day drying was performed. In the TEM image, a structure that particles are arranged with regularity was found there were spots having 6 times of being an object on a Fourier transform image, thereby checking the formation of a superlattice. And, for the TEM image, an image of 122 silicon particles was sampled to perform image analysis in the same manner as in Example 3. It was found that an average particle diameter was 11 nm, and the particle diameter had a variation coefficient of 15%.

Example 5

0.2 g of silicon particles having a particle diameter of 1-30 nm were produced by a laser ablation method that emits high-power laser to a silicon wafer in vacuum. The particles were added to 10 ml of distilled water, and ultrasonic waves were applied for one hour to disperse the powder to prepare a suspension. 0.01 liter of 5% concentration-hydrofluoric acid (HF) was added to the suspension, and ultrasonic waves were applied for one hour. Then, 20 milliliter of 1-octanol was added as a hydrophobic solvent, ultrasonic waves were applied for 30 minutes, and then the resultant product was left standing for two days.

Then, the procedure of Example 3 was performed to prepare a TEM sample. In the TEM image, a structure that particles are arranged with regularity was found there were spots having 6 times of being an object on a Fourier transform image, thereby checking the formation of a superlattice. And, for the TEM image, an image of 147 silicon particles was sampled to perform image analysis in the same manner as in Example 3. It was found that an average particle diameter was 7 nm, and the particle diameter had a variation coefficient of 17%.

Example 6

2 g of powder formed of silicon particle-containing silicon oxide particles synthesized in the same manner as in Example 3 was held at a temperature of 1100° C. for one hour in an argon atmosphere, silicon oxide was dissolved and removed in the same manner as in Example 3, 0.2 liter of 1-octanol was added as a hydrophobic solvent, and ultrasonic waves were applied for 30 minutes.

Then, the application of the ultrasonic waves was stopped, and when the aqueous solution and the hydrophobic solvent had a phase separation to form an interface, and a natural oxidized film was immediately removed by dipping in a 2%-hydrofluoric acid solution for 30 minutes. Besides, a silicon wafer having a hydrophobitized (111) plane exposed on the surface by dipping in a solution of ammonium fluoride ($NH_4F$) adjusted to pH 8 for 10 minutes was horizontally inserted in the vicinity of the interface between the aqueous solution and the hydrophobic solvent such that the surface undergone the hydrophobitization was directed to the hydrophobic solvent (namely, upward), and left standing for two days.

After leaving at rest, the silicon wafer was dried, and the hydrophobitized surface was observed under a field emission scanning electron microscope (FE-SEM). A structure that the particles were arranged on the plane with regularity was observed, and it was found that a superlattice of the silicon particles was formed. An image of 105 silicon particles obtained by the FE-SEM image was sampled to perform image analysis. It was found that an average particle diameter was 5 nm, and the particle diameter had a variation coefficient of 18%.

Ultraviolet ray was emitted to the silicon wafer having the silicon particles arranged, and orange light emission was checked.

Comparative Example 5

Silicon particles were directly deposited on the surface of the silicon wafer hydrophobitized in the same manner as in Example 6 by the laser ablation method to form a film of silicon particles. The film surface was observed by the FE-SEM to observe a structure that particles were partly arranged on the surface with regularity, and it was found that a superlattice of silicon particles was formed. An image of 167 silicon particles obtained by the FE-SEM image was sampled to perform image analysis at a portion where the superlattice was formed. It was found that an average particle diameter was 5 nm, and the particle diameter had a variation coefficient of 29%.

Ultraviolet ray was emitted to the portion of the silicon wafer having the silicon particles arranged, and no light emission was observed.

Comparative Example 6

In Example 3, when the aqueous solution and 1-octanol were separated without leaving to stand at rest for two days after the addition of 1-octanol, the silicon particles dispersed in the 1-octanol were immediately taken with a dropper, dripped on the same support as that in Example 3 and dried at 60° C. for three days. The sample was observed by the TEM to find that a structure of particles arranged or a spot on a Fourier transform image were not recognized and that a superlattice was not formed.

Comparative Example 7

The procedure of Example 5 was performed to produce a suspension of silicon particles. 0.2 liter of xylene was added thereto without adding hydrofluoric acid, ultrasonic waves were applied for 30 minutes, and then the resultant product was left standing for one day. It was found that the silicon particles did not move into the xylene and did not have hydrophobicity.

The suspension was taken with a dropper, dripped on the same support as that in Example 3 and dried at 60° C. for three days. The sample was observed by the TEM to find that a structure of particles arranged or a spot on a Fourier transform image were not recognized though the silicon particles were observed and that a superlattice was not formed.

INDUSTRIAL APPLICABILITY

According to the present invention, a large amount of powder of nanometer-sized silicon particles can be synthesize at a high productivity in an industrial scale, without requiring a special electrolytic apparatus or plasma generating device, and the obtained powder can be used as material powder to contribute to practical application of functional material such as novel and high-performance light-emitting elements and electronic parts.

According to the present invention, the superlattice of nanometer-sized silicon particles can be produced at a high productivity without requiring a specially expensive device and the like, particles having small variations in particle diameter of the silicon particles forming the superlattice and small variations in surface level can be arranged at a remarkable periodicity, so that the material having a desired band structure can be produced stably. Thus, the superlattice of the present invention can produce various types of band structures in accordance with the intended use, and when used for functional materials such as novel light-emitting elements and electronic parts, material characteristics are stabilized, and the performance can be improved with ease. Thus, it can contribute to practical application of the functional materials.

The invention claimed is:

1. A method for production of silicon particles, comprising:
   synthesizing silicon oxide particles which contain silicon particles by performing a gas phase reaction of monosilane gas and oxidizing gas for oxidizing the monosilane gas; and
   removing the silicon oxide by hydrofluoric acid after keeping the silicon oxide particles in an inert atmosphere at 800-1400° C.

* * * * *